(12) United States Patent
Maliverney et al.

(10) Patent No.: US 8,816,036 B2
(45) Date of Patent: Aug. 26, 2014

(54) CATALYSTS FOR REACTION BETWEEN AN ISOCYANATE AND AN ALCOHOL

(75) Inventors: Christian Maliverney, Saint Julien sur Bibost (FR); Laurent Saint-Jalmes, Vourles (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/123,972

(22) PCT Filed: Oct. 12, 2009

(86) PCT No.: PCT/EP2009/007310
§ 371 (c)(1),
(2), (4) Date: Jul. 11, 2011

(87) PCT Pub. No.: WO2010/043354
PCT Pub. Date: Apr. 22, 2010

(65) Prior Publication Data
US 2011/0257286 A1  Oct. 20, 2011

(30) Foreign Application Priority Data
Oct. 13, 2008 (FR) ....................................... 0805637

(51) Int. Cl.
*C08G 18/22* (2006.01)
*C08G 18/42* (2006.01)
*C07C 269/02* (2006.01)
*C08J 9/04* (2006.01)
*C08J 9/08* (2006.01)

(52) U.S. Cl.
USPC ............. 528/55; 521/113; 521/125; 521/130; 528/80; 560/24; 560/25; 560/26; 560/115; 560/157; 560/158

(58) Field of Classification Search
USPC .................. 502/161, 172; 521/113, 125, 130; 528/55, 80; 556/118; 560/24, 25, 26, 560/115, 157, 158
See application file for complete search history.

(56) References Cited

U.S. PATENT DOCUMENTS

| 3,631,146 | A | * | 12/1971 | Briggs et al. | ................... 524/137 |
|---|---|---|---|---|---|
| 3,917,722 | A | * | 11/1975 | Yates | ............................ 568/905 |
| 2004/0192875 | A1 | * | 9/2004 | Kiso et al. | ........................ 528/48 |
| 2006/0052527 | A1 | * | 3/2006 | Weikard et al. | ................ 524/589 |
| 2006/0293486 | A1 | * | 12/2006 | Emmrich et al. | ................ 528/44 |
| 2007/0178235 | A1 | * | 8/2007 | Yamada et al. | ........... 427/255.33 |
| 2008/0015274 | A1 | * | 1/2008 | Burdeniuc et al. | ............. 521/118 |
| 2008/0207938 | A1 | * | 8/2008 | Prasse | ........................... 556/482 |

OTHER PUBLICATIONS

Babcock et al., "Development and Implementation of New Volatile Cd and Zn Precursors for the Growth of Transparent Conducting Oxide Thin Films Via MOCVD," Mat. Res. Soc. Symp. Proc., 2000, pp. 317-328, vol. 623.

Blank et al., "Catalysis of the Isocyanate-Hydroxyl Reaction by Non-Tin Catalysts," Progress in Organic Coatings, 1999, pp. 19-29, vol. 35.

\* cited by examiner

*Primary Examiner* — Rabon Sergent
(74) *Attorney, Agent, or Firm* — Dentons US LLP

(57) ABSTRACT

Catalysts, which are free of tin, are described which are useful in the reaction between an isocyanate and an alcohol, which is a key step for preparing polyurethane polymers. The catalyst is a metal complex or salt of formula (1):

$$[Zn(L^1)_{l_1}(L^2)^{l_2}(Y)_x] \quad (1)$$

in which:
$l_1 \geq 1$ and $l_2 = 0$ or 1; with $l_1 + l_2 = 2$, $x = 1$ or 2,
the symbol $L^1$ represents a ligand which is a β-dicarbonylato anion or the enolate anion of a β-dicarbonyl compound or an acetylacetato anion derived from a β-ketoester,
when $l_1 = 2$, the symbols $L^1$ are identical or different,
the symbol $L^2$ represents an anionic ligand which is different from $L^1$, and
the symbol Y represents a neutral ligand;
where the metal complex or salt C of formula (1) is not zinc diacetylacetonate.

16 Claims, No Drawings

CATALYSTS FOR REACTION BETWEEN AN ISOCYANATE AND AN ALCOHOL

This application is the United States national phase of PCT/EP2009/007310, filed Oct. 12, 2009, and designating the United States (published in the French language on Apr. 22, 2010, as WO 2010/043354 A1; the title and abstract were also published in English), and claims priority of FR 0805637, filed Oct. 13, 2008, each hereby expressly incorporated by reference in its entirety and each assigned to the assignee hereof.

The invention relates to novel catalysts for the reaction between an isocyanate and an alcohol, which is a key stage in the preparation of polyurethane polymers. It relates more specifically to the use of novel catalysts which are not based on tin.

Polyurethanes were initially used in the manufacture of plastic compounds and foams. These polymers have since been developed in very diverse fields of application, such as elastomers, thermoplastics, thermosetting resins, expanded systems, textile fibers and coating systems (coating slips for paper, wood coatings, motor vehicle paints, adhesives, and the like).

Polyurethanes are polymers which comprise at least one urethane group (also known as carbamate group). This group results from the reaction between an alcohol group and an isocyanate group.

Generally, the synthesis of a polyurethane by an uncatalyzed reaction of an isocyanate with a primary or secondary alcohol is carried out at between 50 and 100° C. Numerous catalysts have already been proposed to thus optimize this reaction, for example Lewis acids and bases, and also numerous metal salts. Examples of these catalysts are described in the following papers:

Gambiroza-Jukic et al., Kinetic analysis of bulk polymerization of diisocyanate and polyol; J. Appl. Polym. Sci., 1993, vol. 47, pp. 513-519, Wong et al., Catalysis in competing isocyanate reactions, competing phenyl isocyanate reaction catalyzed with N,N,N',N'',N''-pentamethyldipropylene-triamine; J. Polym. Sci.; Part A, Polym. Chem. Ed., 1986, vol. 24, pp. 2877-2890, and Okada, H. et al., The kinetics of the polyurethane-forming reaction between organic diisocyanates and glycols; Makromol. Chem., 1963, vol. 66, pp. 91-101.

The most widely used metal catalysts are alkyltin carboxylates, the best known of which is dibutyltin dilaurate. However, catalysts based on alkyltin, although very efficient, exhibit the disadvantage of being toxic (CMR-2: toxic for reproduction).

Consequently, a search is underway to replace them in numerous applications with compounds not exhibiting these disadvantages. In addition, the industry is always on the lookout for compounds which are at least as active as dibutyltin dilaurate but which are not based on tin.

The essential objective of the present invention is thus to provide a catalyst for the reaction between an isocyanate and an alcohol which is at least as active as dibutyltin dilaurate but which is not based on tin.

Another essential objective of the present invention is to provide a catalyst which can be used in the synthesis of polyurethanes.

There has now been found, and it is this which constitutes the subject-matter of the present invention, a novel process for preparing a compound A having at least one urethane functional group, comprising a stage 1) which consists in reacting a compound B, having at least one isocyanate functional group, with a compound D, having at least one hydroxyl functional group, in the presence of a catalytically effective amount of at least one catalyst C, characterized in that said catalyst C is a metal complex or salt of following formula (1):

$$[Zn(L^1)_{l_1}(L^2)_{l_2}(Y)_x] \quad (1)$$

in which:
$l_1 \geq 1$ and $l_2 = 0$ or 1; with $l_1 + l_2 = 2$, $x = 0$, 1 or 2, the symbol $L^1$ represents a ligand which is a β-dicarbonylato anion or the enolate anion of a β-dicarbonyl compound or an acetylacetato anion derived from a β-ketoester, when $l_1 = 2$, the symbols $L^1$ can be identical or different,
the symbol $L^2$ represents an anionic ligand which is different from $L^1$,
the symbol Y represents a neutral ligand, and
with the additional condition that the metal complex or salt C of formula (1) is not the compound zinc diacetylacetonate or [Zn(acac)$_2$].

The nature of the neutral ligand Y is not very important and a person skilled in the art will use any type of neutral ligand suitable for the zinc, so as to observe the valency of the zinc. Mention may be made, as examples, of amines, diamines, and the like.

According to a preferred alternative form, said catalyst C is a metal complex or salt of following formula (1):

$$[Zn(L^1)_{l_1}(L^2)_{l_2}] \quad (1)$$

in which:
$l_1 \geq 1$ and $l_2 = 0$ or 1; with $l_1 + l_2 = 2$, the symbol $L^1$ represents a ligand which is a β-dicarbonylato anion or the enolate anion of a β-dicarbonyl compound or an acetylacetato anion derived from a β-ketoester, when $l_1 = 2$, the symbols $L^1$ can be identical or different,
the symbol $L^2$ represents an anionic ligand which is different from $L^1$, and
with the additional condition that the metal complex or salt C of formula (1) is not the compound zinc diacetylacetonate or [Zn(acac)$_2$].

In order to achieve this objective, the inventors have had the credit of demonstrating, entirely surprisingly and unexpectedly, that the use of a metal complex or salt of formula (1) which is based on zinc makes it possible to catalyze the reaction between an isocyanate and an alcohol, which is a key stage in the preparation of polyurethane polymers.

It should be noted that at least a part of the inventive nature of the invention is due to the judicious and advantageous selection of the delimited combinations of metal compounds C according to the invention used as catalyst.

According to a preferred embodiment of the invention, the symbol $L^1$ of the formula (1) described above is a β-diketonato anion derived from a β-diketone of following formula (2):

$$R^1COCHR^2COR^3 \quad (2)$$

in which:
the $R^1$ and $R^3$ groups, which are identical or different, each represent a substituted or unsubstituted and linear or branched $C_1$-$C_{30}$ hydrocarbon radical;
the $R^2$ group is a hydrogen or a hydrocarbon radical, preferably a $C_1$-$C_4$ alkyl; and
the $R^1$ and $R^2$ groups can be connected so that the β-diketone forms a ring.

According to another preferred embodiment of the invention, the β-dicarbonylato ligand $L^1$ is a β-ketoesterato anion chosen from the group consisting of the anions derived from the following compounds: the methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid or those described in the patent application FR-A-1 435 882.

Another subject matter of the present invention is a process for preparing a compound A having at least one urethane functional group, comprising a stage 1) which consists in reacting a compound B, having at least one isocyanate functional group, with a compound D, having at least one hydroxyl functional group, in the presence of a catalytically effective amount of at least one catalyst C, characterized in that said catalyst C is a metal complex or salt of following formula (1):

(1)

in which:
$l_1 \geq 1$ and $l_2 = 0$ or 1; with $l_1 + l_2 = 2$, $x = 0$, 1 or 2,
the symbol $L^2$ represents an anionic ligand which is different from $L^1$,
the symbol Y represents a neutral ligand, and
the symbol $L^1$ is a β-diketonato anion derived from a β-diketone of formula $R^1COCHR^2COR^3$ (2) and said β-diketone is chosen from the group consisting of the β-diketones: 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptane-dione; 2-acetylcyclohexanone (Cy-acac); 2,2,6,6-tetra-methyl-3,5-heptanedione (t-Bu-acac); 2,2,7-trimethyl-3,5-octanedione; 1,1,1,5,5,5-hexafluoro-2,4-pentane-dione (F-acac); benzoylacetone; dibenzoylmethane; 3-methyl-2,4-pentanedione; 3-acetylpentane-2-one; 3-acetyl-2-hexanone; 3-acetyl-2-heptanone; 3-acetyl-5-methyl-2-hexanone; stearoylbenzoylmethane; octanoyl-benzoylmethane; 4-(t-butyl)-4'-methoxydibenzoylmethane; 4,4'-dimethoxydibenzoylmethane; 4,4'-di(tert-butyl)dibenzoylmethane and 2,4-undecanedione.

According to a preferred embodiment, said catalyst C is a metal complex or salt of following formula (1):

(1)

in which:
$l_1 \geq 1$ and $l_2 = 0$ or 1; with $l_1 + l_2 = 2$,
the symbol $L^1$ is a β-diketonato anion derived from a β-diketone of formula $R^1COCHR^2COR^3$ (2) and said β-diketone is chosen from the group consisting of the β-diketones: 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 2,2,7-trimethyl-3,5-octanedione; 1,1,1,5,5,5-hexafluoro-2,4-pentanedione (F-acac); benzoyl-acetone; dibenzoylmethane; 3-methyl-2,4-pentanedione; 3-acetylpentane-2-one; 3-acetyl-2-hexanone; 3-acetyl-2-heptanone; 3-acetyl-5-methyl-2-hexanone; stearoylbenzoylmethane; octanoyl-benzoylmethane; 4-(t-butyl)-4'-methoxydibenzoyl-methane; 4,4'-dimethoxydibenzoylmethane; 4,4'-di(tert-butyl) dibenzoylmethane and 2,4-undecanedione.

In order to describe in a little more detail the nature of the constituent elements of the metal complex or metal salt of formula (1) according to the invention, it is important to specify that $L^2$ is an anionic ligand which can be selected from the group consisting of the anions: fluoro (F⁻), chloro (Cl⁻), triiodo(1⁻) (I₃)⁻, difluorochlorato(1⁻) [ClF₂]⁻, hexafluoroiodato(1⁻) [IF₆]⁻, oxochlorato(1⁻)(ClO)⁻, dioxochlorato(1⁻) (ClO₂)⁻, trioxochlorato(1⁻) (ClO₃)⁻, tetraoxochlorato(1⁻) (ClO₄)⁻, hydroxo (OH)⁻, mercapto (SH)⁻, selanido (SeH)⁻, hyperoxo (O₂)⁻, ozonido (O₃)⁻, hydroxo (OH⁻), hydrosulfido (HS₂)⁻, methoxo (CH₃O)⁻, ethoxo (C₂H₅O)⁻, propoxido (C₃H₇O)⁻, methylthio (CH₃S)⁻, ethanethiolato (C₂H₅S)⁻, 2-chloroethanolato (C₂H₄ClO)⁻, phenoxido (C₆H₅O)⁻, phenylthio (C₆H₅S)⁻, 4-nitrophenolato [C₆H₄(NO₂)O]⁻, formato (HCO₂)⁻, acetato (CH₃CO₂)⁻, propionato (CH₃CH₂CO₂)⁻, azido (N₃)⁻, cyano (CN)⁻, cyanato (NCO)⁻, thiocyanato (NCS)⁻, selenocyanato (NCSe)⁻, amido (NH₂)⁻, phosphino (PH₂)⁻, chloroazanido (ClHN)⁻, dichloroazanido (Cl₂N)⁻, [methanaminato(1⁻)] (CH₃NH)⁻, diazenido (HN=N)⁻, diazanido (H₂N—NH)⁻, diphosphenido (HP=P)⁻, phosphonito (H₂PO)⁻, phosphinato (H₂PO₂)⁻, carboxylato, enolato and the amides, alkylato and arylato.

According to a particularly preferred embodiment, $L^2$ is an anionic ligand selected from the group consisting of the anions: acetate, oxalate, propionate, butyrate, isobutyrate, diethylacetate, benzoate, 2-ethyl-hexanoate, sterate, methoxide, ethoxide, isopropoxide, tert-butoxide, tert-pentoxide, 8-hydroxyquinolinate, naphthenate, tropolonate and the oxo $O^{2-}$ anion.

According to another preferred embodiment, the catalyst C is a metal complex or salt chosen from the group consisting of the compounds of following formulae (3) to (9):

(3): [Zn(t-Bu-acac)₂], with (t-Bu-acac)=the 2,2,6,6-tetramethyl-3,5-heptanedionato anion or the enolate anion of 2,2,6,6-tetramethyl-3,5-heptanedione, (4): [Zn(EAA)₂], with EAA=the ethyl acetoacetato anion or the enolate anion of ethyl acetoacetate, (5): [Zn(iPr-AA)₂], with iPr-AA=the isopropyl acetoacetato anion or the enolate anion of isopropyl acetoacetate, (6): [Zn(TMOD)₂], with (TMOD)=the 2,2,7-trimethyl-3,5-octanedionato anion or the enolate anion of 2,2,7-trimethyl-3,5-octanedione, (7): [Zn(UDD)₂], with (UDD)=the 2,4-undecane-dionato anion or the enolate anion of 2,4-undecanedione, (8): [Zn(TMOD)₂(N,N'-dimethylethylenediamine)], with (TMOD)=the 2,2,7-trimethyl-3,5-octanedionato anion or the enolate anion of 2,2,7-trimethyl-3,5-octanedione, and (9): [Zn(TMOD)₂(N-propylethylenediamine)], with (TMOD)=the 2,2,7-trimethyl-3,5-octanedionato anion or the enolate anion of 2,2,7-trimethyl-3,5-octanedione.

The amount of the catalyst is advantageously determined so that the Zn/isocyanate functional group (Zn/NCO) molar ratio is between 1/1000 and 1/50 000, preferably between 1/5000 and 1/30 000 and more preferably still between 1/8000 and 1/20 000.

According to a preferred embodiment, the process according to the invention is particularly suitable for the preparation of polyurethane polymers. Thus, according to a preferred alternative form of the invention, the compound A having at least one urethane functional group is a polyurethane, the compound B having at least one isocyanate functional group is a diisocyanate and the compound D having at least one hydroxyl functional group is a polyol.

According to another preferred embodiment, the process according to the invention is characterized in that stage 1)

consists in reacting, in the absence of moisture and in the presence of an effective amount of the catalyst C according to the invention and as described above, at least one compound B, which is an isocyanate chosen from the group consisting of monoisocyanates, diisocyanates, polyisocyanates and their mixtures, and at least one compound D, which is an alcohol chosen from the group consisting of monoalcohols, diols, polyols and their mixtures.

Mention may be made, by way of illustration of compounds B of use according to the invention and having at least one isocyanate functional group, of mono-, di- or polyisocyanates which are aromatic, cyclic, saturated or aliphatic and which are well known to a person skilled in the art, and the mixtures of these compounds.

According to the standard use in chemistry, when a functional group has given its name to a family of compounds (in other words, when a functional group is eponymous with a family of products, as is the case for the isocyanates), the aromatic or aliphatic nature is defined according to the point of attachment of the functional group under consideration.

When an isocyanate is situated on a carbon of aliphatic nature, then it is considered that the isocyanate compound is itself of aliphatic nature. Likewise, when an isocyanate functional group is attached to the backbone via a carbon of aromatic nature, then the whole of the monomer will be denoted by the expression aromatic isocyanate. Thus:

any isocyanate functional group for which the point of attachment of the nitrogen is a member of an aromatic ring is regarded as "aromatic"; and any isocyanate functional group for which the point of attachment of the nitrogen is a carbon of $sp^3$ hybridization is regarded as "aliphatic".

Mention may be made, as examples of aromatic isocyanates, of diphenylmethane diisocyanate (MDI), in particular 4,4'-diphenylmethane diisocyanate or 2,4'-diphenylmethane diisocyanate, or toluene diisocyanate (TDI), in particular 2,4-toluene diisocyanate and 2,6-toluene diisocyanate.

Mention may be made, as examples of alphatic isocyanates, of hexamethylene diisocyanate (HMDI), 1,3-tetramethylxylylene diisocyanate, isophorone diisocyanate and dicyclohexamethylmethane diisocyanate.

Mention may be made, as examples of cycloaliphatic diisocyanates, of isophorone diisocyanate (IPDI).

It is thus possible, for the preparation of a linear polyurethane polymer, to conventionally react a diisocyanate and a diol. The reactions concerned can progress according to numerous alternative forms: at least two reactants of different types (isocyanate/alcohol) have to be involved; these reactants can be mono- or difunctional.

Mention may be made, as example of compound D having at least one hydroxyl functional group, without intending to be restricted thereto, of polyols, such as glycerol, polyglycerol, glycol, propylene glycol, glycols comprising from 2 to 10 carbon atoms, preferably from 2 to 6 carbon atoms, such as ethylene glycol, diethylene glycol, 1,4-butanediol, 1,5-pentanediol, 1,6-hexane-diol, 1,10-decanediol, 1,3-propanediol, dipropylene glycol, polyethylene glycol, polypropylene glycol, neopentyl glycol, pentaerythritol, neopentyl glycol hydroxypivalate, dipentaerythritol, trimethylolpropane, 2-butyl-2-ethyl-1,3-propanediol, sorbitol, mannitol, xylitol and meso-erythritol. Use may also be made of esters of these diols or polyester polyols and also polyether polyols.

In a known way, the polyester polyols are generally chosen from aliphatic and aromatic polyester polyols and the mixtures of these compounds.

Mention may be made, by way of example, of the polyester polyols resulting from the condensation of aliphatic, cyclic or aromatic polyols, such as 1,2-ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyl-diethanolamine and the mixtures of these compounds, with a dicarboxylic acid, such as 1,6-hexanedioic acid, dodecanedioic acid, azelaic acid, sebacic acid, adipic acid, 1,18-octadecanedioic acid, phthalic acid, succinic acid and the mixtures of these diacids, an unsaturated anhydride, such as maleic anhydride or phthalic anhydride, or a homopolymer of a lactone, such as ε-caprolactone.

The polyester polyols are generally obtained by the use of an excess of di- or polyfunctional alcohol in their polyesterification with dicarboxylic acids or carboxylic acid anhydrides.

The polyether polyols are generally obtained by the anionic or cationic polyaddition of cyclic monomers, such as ethylene oxide, propylene oxide or tetrahydrofuran.

The molar masses of the polyether polyols used in the synthesis of polyurethanes generally vary from 250 to 8000. Their functionality can range from 2 to 7, depending on the nature of the molecule used as initiator. The end groups of these polyether diols can be primary or secondary.

According to another preferred embodiment, the process according to the invention is characterized in that stage 1) is carried out in the presence of an expanding agent.

Numerous expanding agents are well known in the art and they are used in amounts varied according to the cell size desired in the final product, which is a polyurethane foam. The most economic of these agents is water but use is often made, alone or mixed with water, of halogenated short-chain alkanes carrying chlorine and/or fluorine. The expanding agents are often used in amounts amounting to up to 50% of the weight of the polyol.

The invention also relates to the novel compounds of the formulae (7) to (9):

(7): [Zn(UDD)$_2$], with (UDD)=the 2,4-undecane-dionato anion or the enolate anion of 2,4-undecanedione, (8): [Zn(TMOD)$_2$(N,N'-dimethylethylenediamine)], with (TMOD)=the 2,2,7-trimethyl-3,5-octanedionato anion or the enolate anion of 2,2,7-trimethyl-3,5-octanedione, and (9): [Zn(TMOD)$_2$(N-propylethylenediamine)], with (TMOD)=the 2,2,7-trimethyl-3,5-octanedionato anion or the enolate anion of 2,2,7-trimethyl-3,5-octanedione.

Of course, various modifications may be introduced by a person skilled in the art into the processes which have just been described solely by way of nonlimiting examples without departing from the scope of the invention.

Other advantages and characteristics of the present invention will become apparent on reading the following examples, given by way of illustration and without implied limitation.

EXAMPLES

1-Catalysts According to the Invention

Catalyst (5): [Zn(isopropyl acetoacetato)$_2$] or [Zn(iPr-AA)$_2$], with iPr-AA=the isopropyl acetoacetato anion or the enolate anion of isopropyl acetoacetate A solution of 100 mmol of 97% sodium methoxide (6.12 g) in 100 ml of isopropanol is concentrated by distillation of 20%, then 100 mmol of 95% isopropyl acetoacetate (15.93 g) are added and the solution is heated at 80° C. for 1 h to give a homogeneous orange solution. A solution of zinc chloride (50 mmol, 7 g) in 50 ml of isopropanol is then added at 70° C. over 1 h. Heating is maintained at between 80 and 90° C. for 3 h 30 and then the sodium chloride formed is filtered off after cooling. The alcoholic solution is evaporated to dryness to result in 25.3 g of a paste, which is redissolved in 200 ml of ethanol. After filtering under hot conditions and evaporating to dryness, 17.2 g of a white solid are obtained (Yd 98%).

Zn calc.: 18.59 weight %. found (ICP): 18.57 weight %
IR (nm): 2989, 1617, 1514, 1246, 1170.

Catalyst (6): [Zn(TMOD)$_2$], with (TMOD)=the 2,2,7-trimethyl-3,5-octanedionato anion or the enolate anion of 2,2,7-trimethyl-3,5-octanedione 0.21 mol of 95% 2,2,7-trimethyl-3,5-octanedione is added at 20° C. over 1 h to a solution of 0.21 mol of potassium hydroxide in 88 g of ethanol. A solution of 0.105 mol of anhydrous zinc chloride in 16 g of ethanol is subsequently added to the homogeneous solution over 1 h. The mixture is stirred at 30° C. for 3 h, 23 g of heptane are then added and the suspension is cooled to 6° C. and then filtered. The solid is rinsed with 100 g of heptane and the filtrate is evaporated up to 90° C. under 4 mbar to give 46 g of zinc bis(2,2,7-trimethyl-3,5-octanedionate) in the form of a thick honey.

Zn calc.: 15.14 weight %. Zn found: 14.50 weight %
IR (nm): 2953, 1574, 1509, 1410, 1162.

(6)

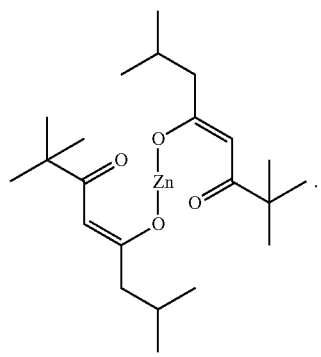

Catalyst (7): [Zn(UDD)$_2$], with (UDD)=the 2,4-undecanedionato anion or the enolate anion of 2,4-undecanedione 30 mmol of 2,4-undecanedione are added to a solution of 30 mmol of sodium methoxide in 10 g of ethanol at 70° C. followed, after 1 h, by a solution of 15 mmol of anhydrous zinc chloride in 2.5 g of ethanol. The mixture is stirred at 70° C. for 3 h, then 20 g of heptane are added and the suspension is cooled to 6° C. and then filtered. The solid is rinsed with 20 g of heptane and the filtrate is evaporated up to 90° C. under 4 mbar to give 6.2 g of zinc bis(2,4-undecanedionate) in the form of a pale yellow liquid of low viscosity.

Zn calc.: 15.14 weight %. Zn found: 15.74 weight %
IR (nm): 2992, 1575, 1511, 1389, 1015, 774.

(7)

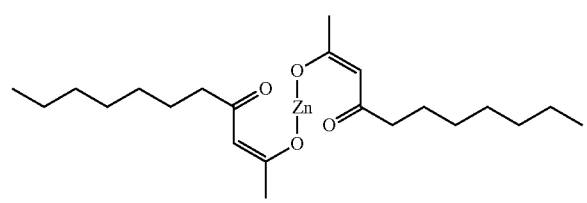

as well as 2 complexes of Zn(TMOD)$_2$ with an ethylenediamine derivative:

[Zn(TMOD)$_2$(N,N'-dimethylethylenediamine)] (8) prepared in the following way:

1 molar equivalent of N,N'-dimethylethylenediamine (example 10 mmol=0.9 g) is added over 5 min to a solution of 1 molar equivalent of Zn(TMOD)$_2$ (example 10 mmol=4.4 g) in diisopropyl ether (example 30 ml). After 30 min, the clear solution is evaporated to give a viscous oil corresponding to the expected complex (example 10 mmol ~5.2 g, 100%).

$^1$H NMR (C$_6$D$_{14}$): 5.23 (s, 2H), 2.77 (s, 4H), 2.41 (s, 6H), 2.04 (m, 2H), 1.94 (d, 4H), 1.08 (s, 18H), 0.94 (d, 12H).

[Zn(TMOD)$_2$(N-propylethylenediamine)] (9), prepared in the following way:

1 molar equivalent of N-propylethylenediamine (example 10 mmol=1.02 g) is added over 5 min to a solution of molar equivalent of Zn(TMOD)$_2$ (example 10 mmol=4.4 g) in diisopropyl ether (example 30 ml). After 30 min, the cloudy solution is evaporated to give a white solid corresponding to the expected complex (example 10 mmol–5.4 g, 100%).

$^1$H NMR (C$_6$D$_{14}$): 5.23 (s, 2H), 2.86 (m, 2H), 2.74 (m, 2H), 2.62 (t, 2H), 2.03 (m, 2H), 1.93 (d, 4H), 1.56 (sext, 2H), 1.07 (s, 18H), 0.92 (d, 12H), 0.86 (t, 3H), and Catalyst (3): [Zn(t-Bu-acac)$_2$], with (t-Bu-acac)=the 2,2,6,6-tetramethyl-3,5-heptanedionato anion or the enolate anion of 2,2,6,6-tetramethyl-3,5-heptanedione, CAS 14363-14-5, supplied by Sigma-Aldrich, MW=431.9 g/mol, as a 30% solution in ethyl acetate or butyl acetate after heating.

2-Operating Conditions 2.1 First Series of Tests

A formulation composed of 2,4-TDI (2,4-diisocyanato-1-methylbenzene) and of polypropylene glycol with a weight of 2000 g/mol is prepared with an OH/NCO molar ratio which is equal to 0.5. The catalyst is added to this formulation. The tests are carried out in a jacketed reactor at 60° C. under a nitrogen headspace.

In order to be able to establish comparisons with the comparative catalyst (tin catalyst, dibutyltin dilaurate or DBTL), the operations are carried out with the same equivalent of metal. The catalyst (3) is thus employed with a Zn/NCO molar ratio=0.008%.

Kinetic monitoring is carried out by quantitatively determining the —N=C—O (NCO) functional groups in the usual way, according to the standard AFNOR NF T 52-132 (September 1988), sometimes denoted by dibutylamine method. The principle of this quantitative determination is based on the reaction of the isocyanate groups with the excess di(n-butyl)amine. The amine is introduced in solution in toluene (1N). The reaction time is 15 minutes at ambient temperature. The excess di(n-butyl)amine is subsequently quantitatively determined by titration with hydrochloric acid (1N). Bromocresol green is used as indicator.

The effectiveness of the catalyst (3) is noticed since, after 1 h 30, the degree of conversion of the isocyanate —N=C=O functional groups of 50% is reached.

The degree of conversion of the control catalyst (Comparative 1=dibutyltin dilaurate or DBTL) of 50% is reached after 40 minutes.

A third test (Comparative 2) is carried out without the presence of catalyst and here, in order to reach the same degree of conversion of 50%, it was necessary to wait for 6 hours of reaction.

The molecular weight distribution obtained and the use of twofold detection in gel permeation chromatography or GPC (refractometer (RI) and UV) make it possible to affirm the effectiveness of the catalyst according to the invention.

This result is satisfactory and shows the viability of a tin-free catalyst according to the invention. Furthermore, as the kinetics of formation of the polyurethane polymer are slightly slower with the catalyst according to the invention, this exhibits the advantage of giving more time for a stage of forming the polyurethane polymer.

2.2 Second Series of Tests

A formulation composed of a hexamethylene diisocyanate prepolymer with 0.522 mol of NCO/100 g is prepared. 10 g of this polymer in 25 g of xylene (in the form of a solution prepared beforehand) are introduced into a reactor, followed by 6.8 g of 2-ethylhexanol (1 mol of OH/mol of NCO).

The reaction medium is heated and, when its temperature reaches 40° C., the following are introduced:
  either 5 g of xylene, for the uncatalyzed reaction,
  or 5 g of a solution of the chosen catalyst in xylene,
which corresponds to t=0 of the reaction (starting of the stopwatch).

Various catalysts according to the invention were tested:
  [Zn(TMOD)$_2$], with (TMOD)=the 2,2,7-trimethyl-3,5-octanedionato anion or the enolate anion of 2,2,7-trimethyl-3,5-octanedione (6),
  [Zn(UDD)$_2$], with (UDD)=the 2,4-undecanedionato anion or the enolate anion of 2,4-undecanedione (7),
as well as 2 complexes of Zn(TMOD)$_2$ with an ethylenediamine derivative:
  [Zn(TMOD)$_2$(N,N'-dimethylethylenediamine)] (8),
  [Zn(TMOD)$_2$(N-propylethylenediamine)] (9).

By way of comparison, two catalysts based on tin were also tested:
  dibutyltin dilaurate (DBTDL),
  dioctyltin dilaurate (DOTDL), and
  [Zn(acac)$_2$] or zinc diacetylacetonate.

The activity of the novel catalysts is compared with that of dibutyltin dilaurate. In the following table, one equivalent of dibutyltin dilaurate corresponds to $1.58 \times 10^{-5}$ mol of tin per 10 g of hexamethylene diisocyanate prepolymer. The catalytic potential is evaluated by the degree of conversion of the isocyanate functional groups at t=10 minutes. The disappearance of the isocyanate functional groups is monitored by infrared analysis.

The amounts of catalyst used and the results obtained are described in detail in the following table:

TABLE 1

| Test | Catalyst | Molar equivalent | DC of the N=C=O functional groups (%) at t = 10 min |
|---|---|---|---|
| Comparative 1 | DBTDL | 1 | 99.2 |
| Comparative 2 | DOTDL | 1 | 98.9 |
| Comparative 3 | [Zn(acac)$_2$] | 3 | 62.2 |
| Invention 4 | [Zn(TMOD)$_2$] (6) | 3 | 76.0 |
| Invention 5 | [Zn(UDD)$_2$)] (7) | 3 | 81.1 |
| Invention 6 | [Zn(TMOD)$_2$(N,N'-dimethylethylenediamine)] (8) | 3 | 91.0 |
| Invention 7 | [Zn(TMOD)$_2$(N-propylethylenediamine)] (9) | 3 | 88.8 |

The catalysts according to the invention make it possible to obtain a good degree of conversion of the isocyanate functional groups after reacting for 10 minutes. They exhibit an activity which is greater by 22% (for [Zn(TMOD)$_2$]) to 46% (for [Zn(TMOD)$_2$(N,N'-dimethylethylenediamine)]) than that of [Zn(acac)$_2$].

The catalysts according to the invention thus represent an effective alternative to the catalysts based on tin for the reaction between an isocyanate and an alcohol.

What is claimed is:

1. A process for preparing a compound A having at least one urethane functional group, the process comprising a stage 1) which comprises reacting a compound B, having at least one isocyanate functional group, with a compound D, having at least one hydroxyl functional group, in the presence of a catalytically effective amount of at least one catalyst C, wherein the catalyst C is a metal complex or salt of following formula (1):

$$[Zn(L^1)_{l1}(L^2)_{l2}(Y)_x] \quad (1)$$

in which:
  $l_1 \geq 1$ and $l_2 = 0$ or 1; with $l_1 = l_2 = 2$, x=1 or 2,
  the symbol $L^1$ represents a ligand which is a β-dicarbonylato anion or the enolate anion of a β-dicarbonyl compound or an acetylacetato anion derived from a β-ketoester,
  when $l_1 = 2$, the symbols $L^1$ are identical or different,
  the symbol $L^2$ represents an anionic ligand which is different from $L^1$,
  the symbol Y represents a neutral ligand, and
  with the additional condition that the metal complex or salt C of formula (1) is not the compound zinc diacetylacetonate or [Zn(acac)$_2$].

2. The process as claimed in claim 1, wherein compound A is a polyurethane, compound B is a diisocyanate and the compound D having at least one hydroxyl functional group is a polyol.

3. The process as claimed in claim 1, wherein compound B is an isocyanate selected from the group consisting of monoisocyanates, diisocyanates, polyisocyanates and mixtures thereof, compound D is an alcohol selected from the group consisting of a monoalcohol, a diol, a polyol and mixtures thereof, and the reaction occurs without moisture.

4. The process as claimed in claim 1, wherein compound B is a diisocyanate selected from the group consisting of:
  diphenylmethane diisocyanate (MDI), toluene diisocyanate (TDI), hexamethylene diisocyanate (HMDI), 1,3-tetramethylxylylene diisocyanate, isophorone diisocyanate, dicyclohexamethylmethane diisocyanate and isophorone diisocyanate (IPDI).

5. The process as claimed in claim 4, wherein the diphenylmethane diisocyanate (MDI) is 4,4'-diphenylmethane diisocyanate or 2,4'-diphenylmethane diisocyanate.

6. The process as claimed in claim 4, wherein the toluene diisocyanate (TDI) is 2,4-toluene diisocyanate or 2,6-toluene diisocyanate.

7. The process as claimed in claim 1, wherein compound D is a polyester polyol.

8. The process as claimed in claim 1, wherein the symbol $L^1$ is a β-diketonato anion derived from a β-diketone of following formula (2):

$$R^1COCHR^2COR^3 \quad (2)$$

in which:
  the $R^1$ and $R^3$ groups, which are identical or different, each represent a substituted or unsubstituted and linear or branched $C_1$-$C_{30}$ hydrocarbon radical;
  the $R^2$ group is a hydrogen or a hydrocarbon radical: and
  the $R^1$ and $R^2$ groups are optionally connected so that the β-diketone forms a ring.

9. The process as claimed in claim 8, wherein the $R^2$ group is a $C_1$-$C_4$ alkyl.

10. The process as claimed in claim 1, wherein the neutral ligand is an amine or a diamine.

11. The process as claimed in claim 1, wherein stage 1) is carried out with an expanding agent being present.

12. The process as claimed in claim 11, wherein the expanding agent is water.

13. A process for preparing a compound A having at least one urethane functional group, the process comprising a stage 1) which comprises reacting a compound B, having at least one isocyanate functional group, with a compound D, having at least one hydroxyl functional group, in the presence of a catalytically effective amount of at least one catalyst C, wherein the catalyst C is a metal complex or salt of following formula (1):

  (1)

in which:
$l_1 \geq 1$ and $l_2 = 0$ or 1; with $l_1+l_2=2$, $x=1$ or 2, the symbol $L^2$ represents an anionic ligand which is different from $L^1$, the symbol Y represents a neutral ligand, and the symbol $L^1$ is a β-diketonato anion of a β-diketone selected from the group consisting of 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 2,2,7-trimethyl-3,5-octanedione; 1 1,1,5,5,5-hexafluoro-2,4-pentanedione (F-acac); benzoylacetone; dibenzoylmethane; 3-methyl-2,4-pentanedione; 3-acetylpentane-2-one; 3-acetyl-2-hexanone; 3-acetyl-2-heptanone; 3-acetyl-5-methyl-2-hexanone; stearoylbenzoylmethane; octanoylbenzoylmethane; 4-(t-butyl)-4'-methoxydibenzoylmethane; 4,4'-dimethoxydibenzoylmethane; 4,4'-di(tert-butyl)dibenzoylmethane and 2,4-undecanedione.

14. The process as claimed in claim 13, wherein $L^2$ is an anionic ligand selected from the group consisting of: fluoro ($F^-$), chloro ($Cl^-$), triiodo $(I_3)^{31}$, difluorochlorato $[ClF_2]^-$, hexafluoroiodato $[IF_6]^-$, oxochlorato$(ClO)^-$, dioxochlorato $(ClO_2)^-$, trioxochlorato $(ClO_3)^-$, tetraoxochlorato $(ClO_4)^-$, hydroxo $(OH)^-$, mercapto $(SH)^-$, selanido $(SeH)^-$, hyperoxo $(O_2)^-$, ozonido $(OH_3)^-$, hydroxo $(OH^-)$, hydrosulfido $(HS_2)^-$, methoxo $(CH_3O)^-$, ethoxo $(C_2H_5O)^-$, propoxido $(C_3H_7O)^-$, methylthio $(CH_3S)^-$, ethanethiolato $(C_2H_5S)^-$, 2-chloroethanolato $(C_2H_4ClO)^-$, phenoxido $(C_6H_5O)^-$, phenylthio $(C_6H_5S)^-$, 4-nitrophenolato $[C_6H_4(NO_2)O]^-$, formato $(HCO_2)^-$, acetato $(CH_3CO_2)^-$, propionato $(CH_3CH_2CO_2)^-$, azido $(N_3)^-$, cyano $(CN)^-$, cyanato $(NCO)^-$, thiocyanato $(NCS)^-$, selenocyanato $(NCSe)^-$, amido $(NH_2)^-$, phosphino $(PH_2)^-$, chloroazanido $(ClHN)^-$, dichloroazanido $(Cl_2N)^-$, [methanaminato]$(CH_3NH)^-$, diazenido $(HN=N)^{31}$, diazanido $(H_2N—NH)^-$, diphosphenido $(HP=P)^-$, phosphonito $(H_2PO)^-$, phosphinato $(H_2PO_2)^-$, carboxylato, enolato of an amide, enolato of an alkylato, enolato of an arylato, acetate, oxalate, propionate, butyrate, isobutyrate, diethylacetate, benzoate, 2-ethyl-hexanoate, sterate, methoxide, ethoxide, isopropoxide, tert-butoxide, tert-pentoxide, 8-hydroxyquinolinate, naphthenate, tropolonate and the oxo $(O^{2-})$ anion.

15. The process as claimed in claim 13, wherein the neutral ligand is an amine or a diamine.

16. A process for preparing a compound A having at least one urethane functional group, the process comprising a stage 1) which comprises reacting a compound B, having at least one isocyanate functional group, with a compound D, having at least one hydroxyl functional group, in the presence of a catalytically effective amount of at least one catalyst C, wherein the catalyst C is a metal complex or salt of formulae (8) or (9):

(8): [Zn(TMOD)$_2$(N,N'-dimethylethylenediamine)], with (TMOD)=a 2,2,7-trimethyl-3,5-octanedionato anion or an enolate anion of 2,2,7-trimethyl-3,5-octanedione, and (9): [Zn(TMOD)$_2$(N-propylethylenediamine)], with (TMOD)=a 2,2,7-trimethyl-3,5-octanedionato anion or an enolate anion of 2,2,7-trimethyl-3,5-octanedione.

* * * * *